(12) United States Patent
Froehner et al.

(10) Patent No.: US 10,461,579 B2
(45) Date of Patent: Oct. 29, 2019

(54) METHOD AND SYSTEM FOR MONITORING THE OPERATING STATUS OF AN ENERGY DELIVERY NETWORK

(71) Applicant: SIEMENS AKTIENGESELLSCHAFT, Munich (DE)

(72) Inventors: Wiebke Froehner, Amberg (DE); Thomas Werner, Rednitzhembach (DE)

(73) Assignee: Siemens Aktiengesellschaft, Munich (DE)

( * ) Notice: Subject to any disclaimer, the term of this patent is extended or adjusted under 35 U.S.C. 154(b) by 278 days.

(21) Appl. No.: 15/502,209

(22) PCT Filed: Aug. 14, 2014

(86) PCT No.: PCT/EP2014/067409
§ 371 (c)(1),
(2) Date: Feb. 7, 2017

(87) PCT Pub. No.: WO2016/023585
PCT Pub. Date: Feb. 18, 2016

(65) Prior Publication Data
US 2017/0222477 A1    Aug. 3, 2017

(51) Int. Cl.
*H02J 13/00* (2006.01)
*G05B 23/02* (2006.01)
(Continued)

(52) U.S. Cl.
CPC .......... *H02J 13/0079* (2013.01); *G05B 15/02* (2013.01); *G05B 23/027* (2013.01);
(Continued)

(58) Field of Classification Search
CPC ...... G05B 19/0428; G05B 2219/25062; G05B 23/027; Y02E 10/725; Y02E 10/763; Y02E 60/74; Y04S 10/30; H02J 2003/007
See application file for complete search history.

(56) References Cited

U.S. PATENT DOCUMENTS 5,677,678 A    10/1997    Schweitzer, Jr.
8,665,102 B2    3/2014    Salewske et al.
(Continued)

FOREIGN PATENT DOCUMENTS

DE    102010044186 A1    5/2012
WO    2013107704 A1    7/2013

*Primary Examiner* — Elias Desta
(74) *Attorney, Agent, or Firm* — Laurence Greenberg; Werner Stemer; Ralph Locher (57) ABSTRACT

A method monitors an operating state of an energy supply network. Measurement values indicating an operating state are detected using sensors which are provided at measurement points paired with primary components of the energy supply network, and a visualization indicating the operating state of the energy supply network at each measurement point is generated using a monitor. The aim is to minimize the configuration and parameterization complexity for the operator of the energy supply network. The measurement values are transmitted from the sensors to an application server. The measurement values are analyzed, thereby forming system status values, the system status values indicating the operating state of the energy supply network at the measurement points. The system status values are transmitted to the monitoring device and a visualization which indicates the operating state of the energy supply network is generated by the monitoring device using the system status values and displayed.

17 Claims, 3 Drawing Sheets

(51) Int. Cl.
 *G05B 15/02* (2006.01)
 *H04W 4/70* (2018.01)
(52) U.S. Cl.
 CPC ..... *G05B 2219/25062* (2013.01); *H04W 4/70* (2018.02); *Y02E 60/74* (2013.01); *Y04S 10/30* (2013.01); *Y04S 10/522* (2013.01)

(56) References Cited

U.S. PATENT DOCUMENTS

| | | | |
|---|---|---|---|
| 9,614,648 B2* | 4/2017 | Zhang | G01D 3/00 |
| 2007/0118301 A1* | 5/2007 | Andarawis | G01M 5/00 |
| | | | 702/33 |
| 2010/0013632 A1 | 1/2010 | Salewske et al. | |
| 2013/0064178 A1 | 3/2013 | Cs et al. | |
| 2015/0018006 A1* | 1/2015 | Pollmann | H04L 61/2038 |
| | | | 455/456.1 |

* cited by examiner

METHOD AND SYSTEM FOR MONITORING THE OPERATING STATUS OF AN ENERGY DELIVERY NETWORK

BACKGROUND OF THE INVENTION

Field of the Invention

The invention relates to a method for monitoring the operating status of an energy delivery network, in which method, sensors, which are provided at measurement locations assigned to primary components of the energy delivery network, acquire measured values indicating an operating status of the energy delivery network, and on the basis of the measured values or values derived therefrom, a monitoring device of the operator of the energy delivery network generates a visualization that indicates the operating status of the energy delivery network at the measurement location of the particular sensor. The invention also relates to a corresponding system for monitoring an energy delivery network, which system comprises such sensors and a monitoring device of this type.

The invention can apply to various types of energy delivery networks, e.g. to electrical energy delivery networks, or to distribution networks for gas, oil, heat (steam, water) or compressed air. The invention is described below with reference to electrical energy delivery networks merely by way of example.

Electrical energy delivery networks are used for the transmission and distribution of electrical power from the generator through to the end user. An important task of an operator of an energy delivery network is to safeguard and improve the reliability of the supply of electrical power to the end user. It is therefore in the interests of the operator to reduce any outage times in the supply of electrical power (for instance as a result of short-circuits or ground faults in the energy delivery network). Before it is possible to rectify a fault that has occurred in an energy delivery network, the operator of the energy delivery network must first detect that a fault actually exists in the energy delivery network. In addition, it also takes a certain amount of time subsequently to locate the fault. Thus besides rapid rectification of a fault, the operator of the energy delivery network is especially interested in speeding up these two processes, i.e. detecting and locating a fault.

Whereas transmission grids at the high-voltage level and some distribution grids at the higher medium-voltage levels are relatively widely covered by network automation using relatively expensive protective devices, measuring instruments and substation controllers, and therefore faults can usually be detected and located relatively quickly, there is relatively little automation in particular of the distribution grids at the low medium-voltage levels and the low-voltage level. Thus the associated network operator can only determine the actual operating status of these grids with difficulty. This applies both to the medium-voltage and low-voltage distribution grids typical in Europe and to distribution grids in the form of "feeders" typical in the USA.

The operator of such a distribution grid traditionally receives messages about active power failures directly from its customers, i.e. from the end users. In the event of an electrical power cut, the customers get in touch with the operator of the energy delivery network usually by telephone. These calls are collated, checked and consolidated. This procedure alone, however, takes a relatively large amount of time.

Operators of the electrical distribution grids therefore proceeded to equip distribution grids with relatively simple and low-cost sensors that allow at least monitoring of the operating status of the energy delivery network. An example of such sensors are what are known as fault indicators (also referred to as a "faulted circuit indicator" (FCI) or "fault passage indicator" (FPI)), which, for example, measure the current at their installation location, and infer an admissible or inadmissible operating status from the measured current. There are fault indicators both for overhead lines and for cable conductors.

Earlier fault indicators were merely able to give a local visual signal (e.g. a light signal or the position of a colored disc) when they detected a fault state in their measurement location. U.S. Pat. No. 5,677,678 discloses such a fault indicator, for example. This solely visual indication obliged the maintenance teams to drive along the line which they expected to contain the fault until they reached the fault location.

Thus the shift was made some time ago to using fault indicators having a communication capability, and to incorporate these fault indicators as additional components in a grid control system of the operator of the energy delivery network. U.S. Pat. No. 8,665,102 B2 discloses such a system, for example. In the system disclosed in this document, fault indicators are incorporated together with more complex automation devices ("intelligent electronic devices" (IEDs)) in a central monitoring system. This system additionally uses data supplied by the IEDs to check the plausibility of the data transmitted from the fault indicators to the monitoring system.

A disadvantage with such a system, however, is the additional effort of configuration and parameterization required on the part of the operator of the energy delivery network as a result of integrating the fault indicators in the monitoring system. In addition, a large number of fault indicators are needed because of the relatively large area covered by the distribution grids and the complex structure of these grids, further increasing the time and effort involved.

SUMMARY OF THE INVENTION

Proceeding from a method and a system of the type mentioned above, the object of the invention is thus to define a method and a system for monitoring an energy delivery network that largely minimize the configuration and parameterization effort on the part of the operator of the energy delivery network.

In terms of the method, this object is achieved according to the invention by a method of the type mentioned in the introduction, in which the measured values or values derived therefrom are transmitted from the sensors first to an application server, which is provided outside the sphere of influence of the operator of the energy delivery network, the application server analyses and/or processes the measured values or the values derived therefrom, thereby forming system status values which indicate the operating status of the energy delivery network at the measurement location of the particular sensor, the system status values are transmitted from the application server to the monitoring device of the operator of the energy delivery network, and the monitoring device uses the system status values received from the application server to generate and display the visualization indicating the operating status of the energy delivery network at the measurement location of the particular sensor.

According to the invention, the sensors provided in the energy delivery network are no longer connected directly to a monitoring system of the operator of the energy delivery network, with the result that initially, apart from the physical installation of the sensors at the measurement locations in the energy delivery network, no additional effort is involved for the operator, for example for configuring or parameterizing the monitoring system with regard to the sensor. Instead, the sensor transmits its measured values or the values derived therefrom first to an application server, which lies outside the sphere of influence of the operator of the energy delivery network. The application server may be located, for example, in the sphere of influence of the manufacturer of the sensor or of an external service provider. The operator of the application server provides the information and communications technology interface to the sensor on behalf of the operator of the energy delivery network, and provides the operator of the energy delivery network with the conditioned system status values, which can be visualized by the operator using the monitoring device of said operator. Said visualization can be made in any way and, for example, can be displayed graphically, as a list or table or by a combination of these options.

The sensors may be fault indicators, for example, which measure current and/or voltage on the electrical overhead lines of an electrical energy delivery network and generate corresponding measured values therefrom. The sensors may also be other sensors that acquire measured values describing an operating status of the energy delivery network. For instance, the sensors may be part of a substation or a ring main unit. The sensors may also perform a temperature measurement on lines or transformers, for example. Furthermore, the sensors can also detect status indicators of switches (open, closed, fault) or states of fuses (intact, blown).

In the case of other energy delivery networks, the sensors may also detect, for example, flow rates or flow volumes, pressures, viscosities e.g. of a medium flowing through a line, or status indicators, e.g. of valve states.

The measured values acquired by the sensors may include, for example, an electrical current and/or a voltage and/or a temperature. Values derived therefrom, for instance, may be electrical powers or impedances, may indicate a gradient of the measured values (e.g. the slope of a current rise), or represent events, which are detected by a threshold value comparison (e.g. a current exceeds a current threshold value). The measured values or the values derived therefrom can be transmitted, for example, via predefined data frames or templates (e.g. in XML format), to which are merely added the actual measured values or values derived therefrom.

In the simplest case, the system status values may be the measured values and/or the values themselves derived therefrom, to which has been added information about the corresponding measurement location at which the associated sensor is located. For example, the measured values and/or the values derived therefrom can be displayed on a network topology or a geographical map, and in this form constitute the system status values. The application server can also use further processing steps to form the system status values from the measured values or the values derived therefrom; for instance events can be detected by threshold value comparisons, so that a system status value indicates, for example, that a threshold value is exceeded at a particular measurement location. It is also possible to form mean values, extreme values or effective values from a plurality of measured values or values derived therefrom, and to use these values as system status values. In general it can be stated that a system status value may be any value that contains information useful to the operator of the energy delivery network and relating to the status of the energy delivery network and that comprises a reference to the relevant measurement location.

In a simple case, the system status values may be provided in the form of Web pages, for example, and retrieved and displayed by the operator of the energy delivery network by means of a Web browser running on the monitoring device. In this case, the system status values can be provided by the application server as HTML or XML documents for example. Since these documents are essentially intended for a static information display, dynamic components can also be provided as applets (e.g. Java applets, ActiveX controls) or in the form of Web services, which are embedded in the HTML or XML documents containing the static components.

The monitoring device may be any form of data processing device having a display facility; thus the monitoring device may be a PC or a workstation, e.g. in a grid control center, or a portable computer such as a laptop for instance. In addition, mobile devices such as smartphones or tablet computers can also be used as the monitoring device. The monitoring device must simply comprise software suitable for processing the system status values and for generating a corresponding visualization. This may be, for example, a browser, a dedicated display program or an application for mobile computers (an "APP").

To eliminate any concerns about the communication of network-related information to a third party, it can be provided, if applicable, that the sensors are used to acquire measured values that are merely useful to the network and not critical to the network. While such measured values that are useful to the network improve an overall view of the operating status of the energy delivery network, they cannot be considered critical information in terms of reliable control of the energy delivery network (unlike e.g. measured values from electrical protective devices). In order to secure the transmission of information between the sensors and the application server at one end, and the application server and the monitoring device at the other, communication can preferably be performed in encrypted form in each case.

In order to operate the sensors in the most energy-saving manner possible, it can also be provided that the sensors transmit their measured values or the values derived therefrom to the application server only at certain preset intervals or in an event-driven manner (e.g. on detecting an increased current flow). Specifically, this can largely minimize the electrical energy that must be expended for the communication link to the application server. After the transmission of a measured value or a value derived therefrom to the application server, the sensor disables its communication device again, and then only needs to provide the energy required for detecting and, if applicable, processing and/or analyzing the measured values. The sensor can be supplied with electrical power, for example, from the energy delivery network itself ("energy harvesting"), can obtain its electrical power from regenerative energy sources (e.g. solar cells) or can comprise a battery, a rechargeable battery or a suitably dimensioned capacitor. A combination of different energy sources is also possible.

Although the invention is discussed in the introduction in particular in association with distribution grids at the low medium-voltage levels and at the low-voltage level, it can also be applied correspondingly to other energy delivery networks such as e.g. high-voltage transmission grids or distribution grids at the higher medium-voltage levels. The topology and nature of the energy delivery network is irrelevant to the invention, allowing versatile use of the invention in many different energy delivery networks. As already mentioned in the introduction, the invention can also be used in other energy delivery networks (gas, oil, heat, air, etc.) apart from electrical energy delivery networks.

According to an advantageous embodiment of the method according to the invention, each sensor comprises a long-range communication device, and the measured values or the values derived therefrom are transmitted from the sensors to the application server using a long-range communication link established by the long-range communication device.

In this embodiment, each sensor comprises a long-range communication device, e.g. a cellular communication module based on the GPRS standard or UMTS standard. This device is used to establish a long-range communication link, preferably an IP-based data link, to the application server. A provider of a cellular communication service (telecommunications provider), for example, can be interposed in said link as an intermediary, and the long-range communication link can be established at least in part via a communication network of this provider or at least in part via the Internet. The advantage of this embodiment is that in terms of the communication functions of the individual sensors, only very little or no configuration and/or parameterization effort is involved for the operator of the energy delivery network. Apart from configuring the long-range communication device of each of the sensors with the information needed to establish the long-range communication link (e.g. installing a SIM card from a telecommunications provider), no further effort need actually be made for the individual sensors.

In addition, it is also possible for the manufacturer to preconfigure the particular sensor with the relevant information. Furthermore, for example, the operator of the application server, which may also be the manufacturer of the sensors, can offer the operator of the energy delivery network its service including the applications for operating the long-range communication link (so for example a package comprising the sensor, the service of the application server and a cellular communications contract for the sensor).

According to an alternative embodiment of the method according to the invention, it can also be provided that each sensor comprises a short-range communication device, the sensors use a short-range communication link established to a transmission component by means of the short-range communication device to transmit the measured values they have acquired or the values derived therefrom to the transmission component, and the transmission component transmits the received measured values or the values derived therefrom to the application server.

In this case, each sensor individually does not establish a long-range communication link to the application server. Instead, a short-range communication link can be established between a group of sensors and a transmission component, which may be a remote terminal unit (RTU), for example, or even a selected sensor. The sensors transmit their measured values or the values derived therefrom first via the short-range communication link, which may be, for example, a ZigBee, Bluetooth, Wireless M-Bus or WiFi communication link, to the transmission component, which then as intermediary transmits these values to the application server via a long-range communication link (e.g. a cellular communication link as described in detail for the previous embodiment).

Another advantageous embodiment of the method according to the invention also provides that the sensors attach to the measured values to be transmitted to the application server or the values derived therefrom, a unique sensor identifier and/or position information identifying the geographical position of the measurement location of the sensor concerned.

The amount of information to be transmitted from a sensor to the application server can thereby be kept very low. Specifically, it is sufficient if the application server is able to identify the particular sensor uniquely by means of the unique sensor identifier (e.g. an IP address, a GUID (globally unique identifier), a MAC address, a device number or serial number, etc.) and/or by means of the position information (e.g. Gauss-Kruger coordinates or geographical angles of longitude and latitude), and receives the measured values acquired at the measurement location of the particular sensor or the values derived therefrom. The application server can generate the corresponding system status values relatively easily from this information.

According to another advantageous embodiment of the method according to the invention, it can also be provided that the sensors transmit the acquired measured values to the application server, the application server checks the received measured values with regard to their position in an admissible operating range of the particular primary component to which the sensor concerned is assigned, and the application server forms the system status values according to the result of the check.

In this embodiment, the majority of the processing and/or analysis of the measured values does not take place until performed by the application server, relieving the sensors themselves of this task and also removing the need to expend any effort required for these processing and/or analysis steps for the sensors (e.g. setting threshold values as parameters of the sensors). In this case, the sensors merely transmit the raw data, namely the respective acquired measured values, to the application server, which then performs the processing (e.g. forming derived values, filtering, windowing, averaging etc.) and/or analysis (e.g. determining events by threshold value comparison).

Alternatively, however, it can also be provided that the sensors check the acquired measured values themselves with regard to their position in an admissible operating range of the particular primary component to which the sensor concerned is assigned, that the sensors form the values derived from the acquired measured values according to the result of the check, the sensors transmit the derived values to the application server, and the application server uses the received derived values to form the system status values.

In this case, most of the analysis is already performed by the sensors themselves. The parameters required for this, such as e.g. threshold values defining an admissible operating range, must be specified to a processing device of the sensors. Since in this case the sensors already themselves detect and transmit to the application server the events, fewer settings need to be made at the application server, and the events transmitted by the sensors can usually be converted directly into the system status values and transmitted to the monitoring device of the operator of the energy delivery network.

According to another advantageous embodiment of the method according to the invention, the application server provides topology information describing the layout of the energy delivery network, and the application server uses the received measured values or the values derived therefrom and the topology information to form the system status values by assigning a graphical representation of the operating status of the energy delivery network at the measurement location of the particular sensor to a position in the topology information, which position corresponds to the measurement location.

The topology information may be, for example, a geographical map, which contains the structure of the energy delivery network (node points, path of lines). Alternatively or additionally, the topology information may also be a schematic diagram of the layout of the energy delivery network, which is based more on technical conditions such as e.g. voltage levels etc. (e.g. a grid diagram). In both cases, the system status values comprise a graphical representation of the status of the energy delivery network at a position in the topology information, which position corresponds to the particular measurement location. For example, on the basis of such system status values, the monitoring device can indicate that a current threshold value is exceeded as a graphical symbol in a grid diagram at the position that corresponds to the measurement location of the sensor concerned.

According to another advantageous embodiment of the method according to the invention, it can also be provided that the application server stores in a database, histories of past measured values or values derived therefrom and/or histories of past system status values, and provides same for retrieval by the monitoring device of the operator of the energy delivery network.

It is thereby effectively possible for the application server to create and maintain a database containing historical records of the measured values and/or of the values derived therefrom, which the operator of the energy delivery network can consult as required. This can again save the operator of the energy delivery network expense and effort, i.e. for keeping storage space available and creating and maintaining the database containing the historical records.

According to another advantageous embodiment of the method according to the invention, when forming the system status values, the application server checks whether the system status values indicate an unwanted operating status of the energy delivery network, and on an unwanted operating status being indicated, the application server sends a separate alarm message to a data processing device of the operator of the energy delivery network.

The operator of the energy delivery network can thereby be notified directly and hence quickly of the unwanted operating status (e.g. a short-circuit causing a current threshold value to be exceeded). The separate alarm message in this case can be sent by the application server to pre-configured recipients, in particular employees of the operator of the energy delivery network or of a maintenance service. The recipient data on the recipients can be configured on the application server for this purpose, and in addition a recipient can be selected according to a specific event (e.g. a maintenance engineer is notified when a fault is detected in a line, a grid control engineer is notified when a short-circuit exists). The alarm message can be sent, for example, as an SMS to one or more specified phone numbers and/or as an email to one or more specified email addresses.

According to another advantageous embodiment of the method according to the invention, the sensors also determine state values indicating their own operating status, the state values are transmitted to the application server, the application server analyses and/or processes the state values, thereby forming sensor status values which indicate the operating status of the particular sensor, the sensor status values are transmitted from the application server to the monitoring device of the operator of the energy delivery network, and the monitoring device uses the sensor status values received from the application server to generate and display a visualization indicating the operating status of the particular sensor.

It is thereby possible to monitor and display the operating status of the respective sensors in addition to the network-related system status values. In this case, the state values relate to information concerning the sensor itself, and can comprise, for example, a fault state of the sensor, a charge level of a battery/rechargeable battery of the sensor, the number of events previously detected, the number of communication links previously made to the application server, etc. The state values may be transmitted to the application server in the form of a predetermined template that is completed as required (e.g. an XML template), for example. The sensor status values determined by the application server from the state values may comprise, for example, a critical battery charge level referred to the position of the measurement location of the sensor concerned. The monitoring device can generate therefrom and display a corresponding visualization (e.g. a battery symbol at an appropriate position in a grid diagram).

In general, the explanations already given for the measured values and/or the values derived therefrom and for the system status values apply to the sensor-related state values and to the sensor status values derived therefrom, and therefore each exemplary embodiment relating to the system status values can correspondingly also apply to the sensor status values.

Another advantageous embodiment of the method according to the invention provides that the application server interacts with a configuration device, which, when the operator of the energy delivery network procures a new sensor, transmits to the application server a unique sensor identifier together with an operator identifier specifying the operator of the energy delivery network, and on being put into operation, the sensor uses its unique sensor identifier to register with the application server.

The configuration and parameterization effort can thereby be further reduced because relevant configuration data is transmitted from the configuration device to the application server back at the stage when a new sensor is procured. The application server can thereby be prepared for the forthcoming installation of a new sensor in the energy delivery network, with the result that, for example, the sensor type and the nature of the measured values provided by the sensor and/or values derived therefrom are already entered in the application server. When the sensor now registers with the application server on being put into operation for the first time, the information supplied by the sensor can be used directly by the application server without further settings and converted into system status values. The configuration device may be connected, for example, to part of an online shop or to an online shop, and whenever a new sensor is procured, can transmit to the application server the sensor identifier of the new sensor (and, if applicable, other information relating to the sensor configuration, e.g. addressing, a sensor type, threshold values to be used for determining the system status values). The application server uses this information to form a sensor-related data record, which is activated for the operator of the energy delivery network once the sensor has been put into operation for the first time and registered with the application server.

Finally, according to another advantageous embodiment of the method according to the invention, the application server comprises a plurality of mutually separate data areas, which are protected from accessing one another, sensors belonging to different operators of energy delivery networks transmit their measured values or measured values derived therefrom to the application server, wherein the application server assigns the received measured values or values derived therefrom for each operator solely to a data area associated with that particular operator of an energy delivery network, and the application server forms separately for each data area the system status values, and transmits the system status values solely to a monitoring device of that operator of an energy delivery network associated with the relevant data area.

The particular advantage of this embodiment is that the operator of the application server can offer its service to a plurality of different operators of energy delivery networks. In this case, however, it must be guaranteed that each operator of an energy delivery network can access solely "its own" information, for instance by means of the system status values, which relate to sensors from a specific energy delivery network, being transmitted solely to a monitoring device of the associated operator of the energy delivery network in question.

The object stated above is also achieved by a system for monitoring the operating status of an energy delivery network, which system comprises sensors, which are provided at measurement locations assigned to primary components of the energy delivery network and are designed to acquire measured values indicating an operating status of the electrical energy delivery network, and comprises a monitoring device of the operator of the energy delivery network, which is designed to generate on the basis of the measured values or values derived therefrom a visualization that indicates the operating status of the energy delivery network at the measurement location of the particular sensor.

According to the invention, an application server is provided outside the sphere of influence of the operator of the energy delivery network, the sensors are designed to transmit the measured values or values derived therefrom first to the application server, the application server is designed to analyze and/or process the measured values or the values derived therefrom, thereby forming system status values which indicate the operating status of the energy delivery network at the measurement location of the particular sensor, the application server is also designed to transmit the system status values to the monitoring device of the operator of the energy delivery network, and the monitoring device is designed to use the system status values received from the application server to generate and display the visualization indicating the operating status of the energy delivery network at the measurement location of the particular sensor.

According to an advantageous embodiment of the system according to the invention, at least some of the sensors are fault indicators, which are mounted on lines of the energy delivery network and are designed to acquire measured values that indicate a current flow through the line.

As already explained in the introduction, fault indicators constitute simple and low-cost sensors for monitoring the operating status of an energy delivery network. The current measurements from a fault indicator can be used in particular to detect and locate faults that have occurred (short-circuits, ground faults), since only fault indicators that detect the fault current measure a correspondingly high current.

According to another advantageous embodiment of the system according to the invention, it is also provided that the application server comprises a plurality of mutually separate data areas, which are protected from accessing one another, the application server is designed to receive measured values or measured values derived therefrom from sensors belonging to different operators of energy delivery networks, and to assign the received measured values or values derived therefrom for each operator solely to a data area associated with that particular operator of an energy delivery network, and the application server is designed to form separately for each data area the system status values, and to transmit the system status values solely to a monitoring device of that operator of an energy delivery network associated with the relevant data area.

All the embodiments presented above and below with regard to the method according to the invention apply to the system according to the invention, and vice versa accordingly; in particular, the system according to the invention is designed to implement the method according to the invention in any embodiment or a combination of any embodiments. In addition, with regard to the advantages of the system according to the invention, reference is made to the advantages described for the method according to the invention.

The invention is described in greater detail below with reference to exemplary embodiments. The specific design of the exemplary embodiments shall have no limiting effect whatsoever on the general design of the method according to the invention and of the system according to the invention; in fact individual design features of the exemplary embodiment can be freely combined in any way with one another and with the features described above.

DESCRIPTION OF THE INVENTION

The invention is explained in greater detail below with reference to an example relating to an electrical energy delivery network. As already mentioned, the invention can also be used correspondingly for other energy delivery networks.

Figure 1:
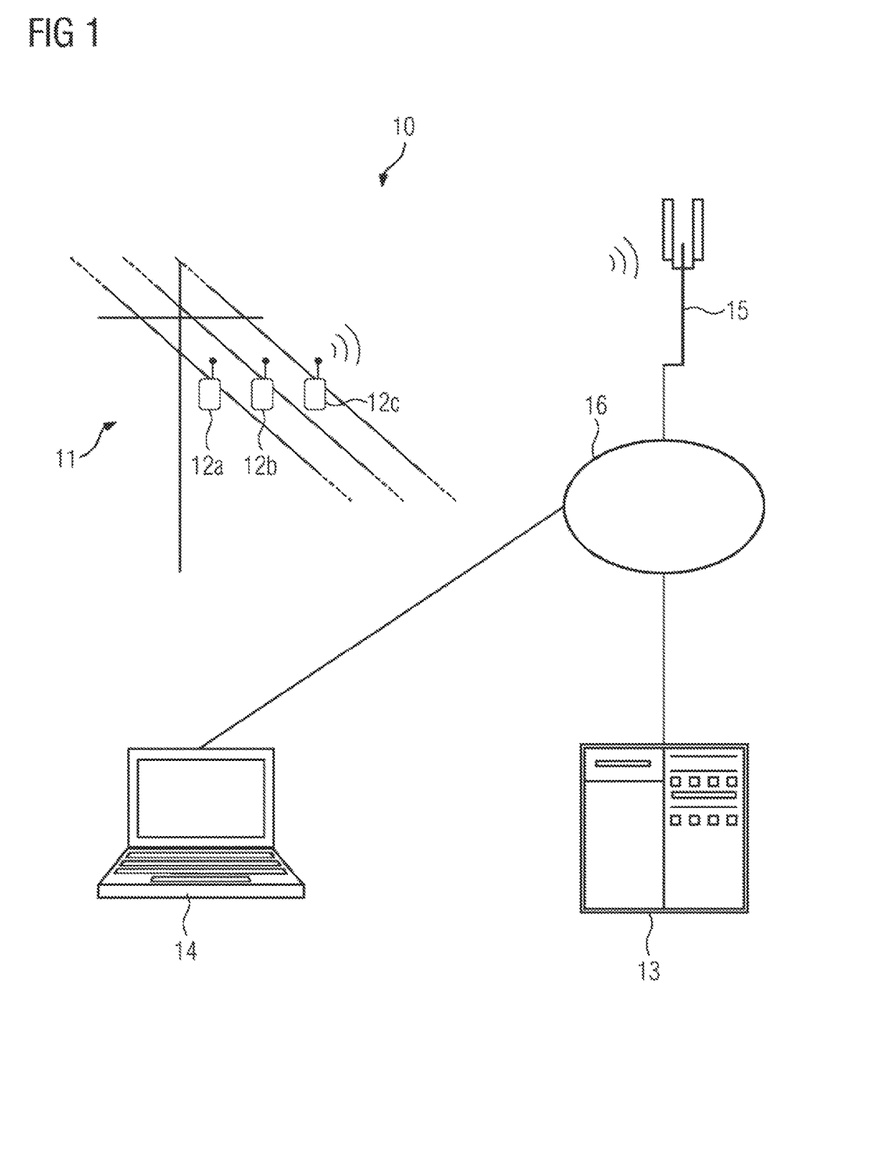
FIG. 1 is a schematic diagram of an exemplary embodiment of a system for monitoring an electrical energy delivery network.

FIG. 1 shows a schematic diagram of a system 10 for monitoring an energy delivery network 11, which is merely represented schematically. The system comprises sensors 12*a-c*, which are arranged at the measurement locations of the energy delivery network 11, where they acquire measured values, from which the operating status of the energy delivery network 11 can be inferred. In the example of FIG. 1, the sensors 12*a-c* are what are known as fault indicators, which are mounted on overhead lines of the electrical energy delivery network and use suitable sensors to detect a current flow in the associated line, from which they generate corresponding measured values. The system 10 also comprises an application server 13 and a monitoring device 14 of the operator of the electrical energy delivery network 11. The application server 13 is located outside the sphere of influence of the operator of the energy delivery network 11 and, for example, can instead be located within the sphere of influence of a manufacturer of the sensors 12a-c or of a service provider, for instance.

The system 10 for monitoring the energy delivery network 11 is operated as follows:

The sensors 12a-c acquire measured values, e.g. current measurements, voltage measurements or temperature measurements, which describe the operating status of the energy delivery network 11 at the measurement location concerned. It shall be assumed in the present example that the sensors 12a-c in the form of fault indicators are used to acquire measured values indicating currents flowing at the measurement location concerned. The measured values or values derived therefrom are then transmitted to the application server 13. The transmission of the measured values or values derived therefrom can be made in this case, for example, at least in the form of a wireless long-range communication link, e.g. a cellular communication link, and/or at least in part via the Internet. In the example shown in FIG. 1, a cellular data link is established between the sensor 12c and a transmit/receive node 15 of a cellular communication provider via a wireless long-range communication link, via which the measured values or the values derived therefrom are transmitted as IP data packets. The received data packets are transmitted from the transmit/receive node 15 to the application server 13 via the Internet 16 or another communication network.

The application server 13 forms system status values from the measured values or the values derived therefrom, and transmits these system status values to the monitoring device 14 of the operator of the energy delivery network 11 e.g. again via the Internet 16. Said system status values are suitable for describing an operating status of the energy delivery network at the measurement location of the sensor 12a-c concerned, e.g. an increased current flow.

For this purpose are usually defined on the application server threshold values that bound an admissible operating status of the energy delivery network 11 at the measurement location concerned. For example, a current threshold value that separates the admissible operating range from an inadmissible operating range is defined for a specific measurement location. The application server compares, for example, the measured value received from the particular sensor 12a-c with the threshold value associated with that sensor. On the current threshold value being exceeded, it is identified that a fault has occurred at the measurement location, and a corresponding system status value is generated, which indicates the event (in this case the fault) and the measurement location of the sensor concerned.

The system status value is then transmitted (automatically or on request) to the monitoring device 14. The monitoring device 14 generates from the system status value a visualization of the operating status of the energy delivery network 11 at the measurement location concerned. In the example described, a visualization indicating a fault by increased current flow is thus generated for the measurement location concerned.

In the same manner, state values that also describe a particular operating status of the sensors 12a-c themselves can be transmitted from the sensors 12a-c to the application server 13. These state values are used by the application server 13 to form sensor status values which are likewise transmitted to the monitoring device.

In addition, the application server 13 can monitor the measured values and/or the values derived therefrom to ascertain whether they are indicating an inadmissible operating status of the energy delivery network 11, and in the event that such a status exists, can send an alarm message, e.g. an email or SMS, to a data processing device of the operator of the energy delivery network 11. This can involve e.g. smartphones or portable computers of employees of the operator of the energy delivery network 11, who are meant to be informed about the inadmissible operating status.

The application server 13 can comprise a database in which historical measured values or values derived therefrom, corresponding system status values, state values or sensor status values or any selection or combination thereof are held available for retrieval by the operator of the energy delivery network.

The application server 13 can be designed for monitoring different energy delivery networks. For this purpose it comprises a plurality of data areas, which are separate from one another, i.e. accesses between the individual data areas are not permitted. Each operator of an energy delivery network is then assigned a separate data area on the application server 13, and it is ensured that measured values or values derived therefrom from sensors belonging to a specific energy delivery network are made accessible solely to the corresponding operator.

In addition, the application server 13 can interact with a configuration device (not shown in FIG. 1), which is connected to a purchasing function (e.g. an online shop), and when a new sensor is purchased, transmits to the application server 13 the sensor identifier of this sensor and the purchaser (i.e. the operator of the energy delivery network for which the sensor is procured). As soon as the procured sensor is installed in the energy delivery network and is registered with the application server 13 for the first time, it is integrated into the monitoring system and activated for the relevant operator of the energy delivery network.

Figure 2:
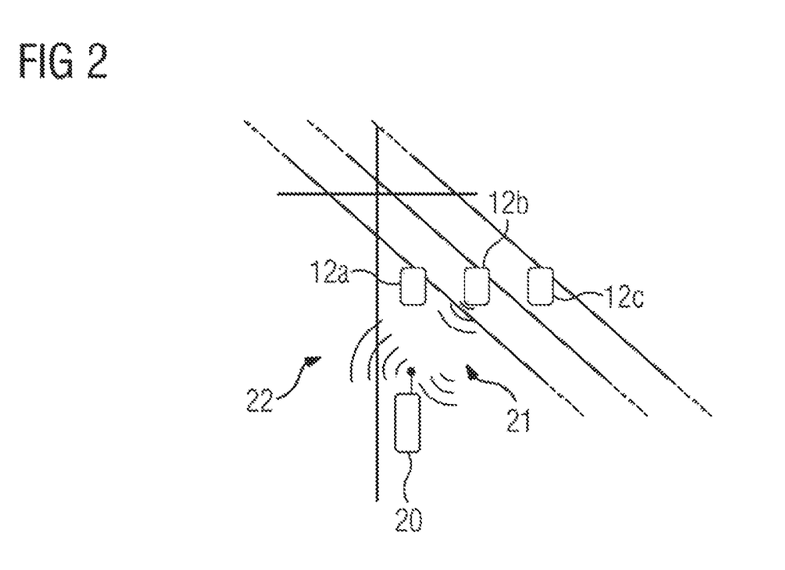
FIG. 2 shows another exemplary embodiment of a communications connection to sensors in an energy delivery network.
Figure 3:
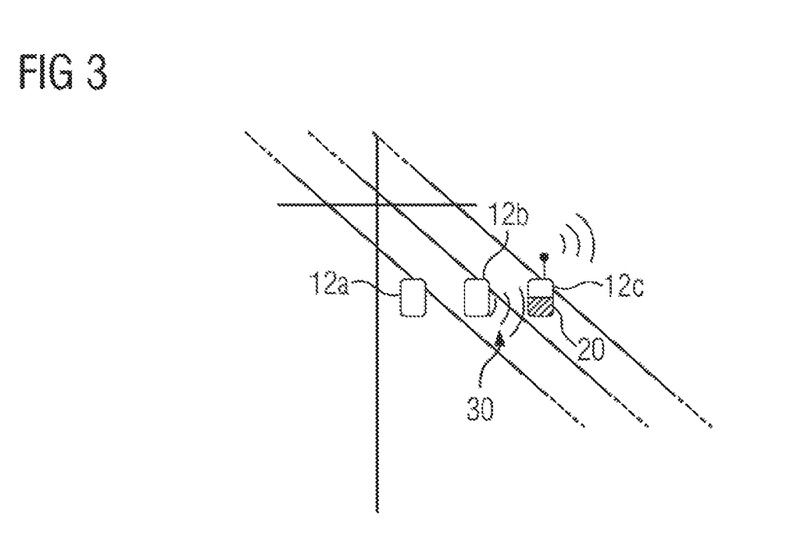
FIG. 3 shows another exemplary embodiment of a communications connection to sensors in an energy delivery network.

As shown in FIG. 1, each sensor 12a-c has its own long-range communication device (e.g. a cellular communication module), via which a long-range communication link can be established with the application server. FIGS. 2 and 3 show other exemplary embodiments in which the measured values or the values derived therefrom can be transmitted from the sensors to the application server.

As shown in FIG. 2, each sensor 12a-c comprises a short-range communication device (e.g. a ZigBee module), via which it can establish a (wireless or wired) short-range communication link to a transmission component 20. In the example of FIG. 2, the sensor 12b has established a wireless short-range communication link 21 to the transmission component 20. The transmission component 20 then transmits the received measured values or values derived therefrom via a long-range communication link 22, e.g. a cellular communication link, to the application server directly or by means of further communication media (e.g. the Internet). The transmission component 20 shown in FIG. 2 is a separate component in this case, e.g. a remote terminal unit, which is positioned in the transmission range of the short-range communication devices of a group of sensors 12a-c.

Alternatively, as shown in the exemplary embodiment of FIG. 3, the transmission component 20 can also be part of one of the sensors 12a-c themselves. In the exemplary embodiment shown in FIG. 3, the transmission component 20 is integrated in the sensor 12c, which therefore comprises both a short-range communication device and a long-range communication device. As shown in FIG. 3, the sensor 12b has established a short-range communication link 30 to the transmission component 20 integrated in the sensor 12c. The sensor 12c transmits the received measured values or values derived therefrom via its long-range communication device to the application server.

It is usual both in the embodiment of FIG. 2 and in the embodiment of FIG. 3 that a group of sensors that are arranged physically close to one another is assigned to the same transmission component 20. The energy delivery network can comprise a plurality of groups of sensors having transmission components 20 each assigned to a group.

Figure 4:
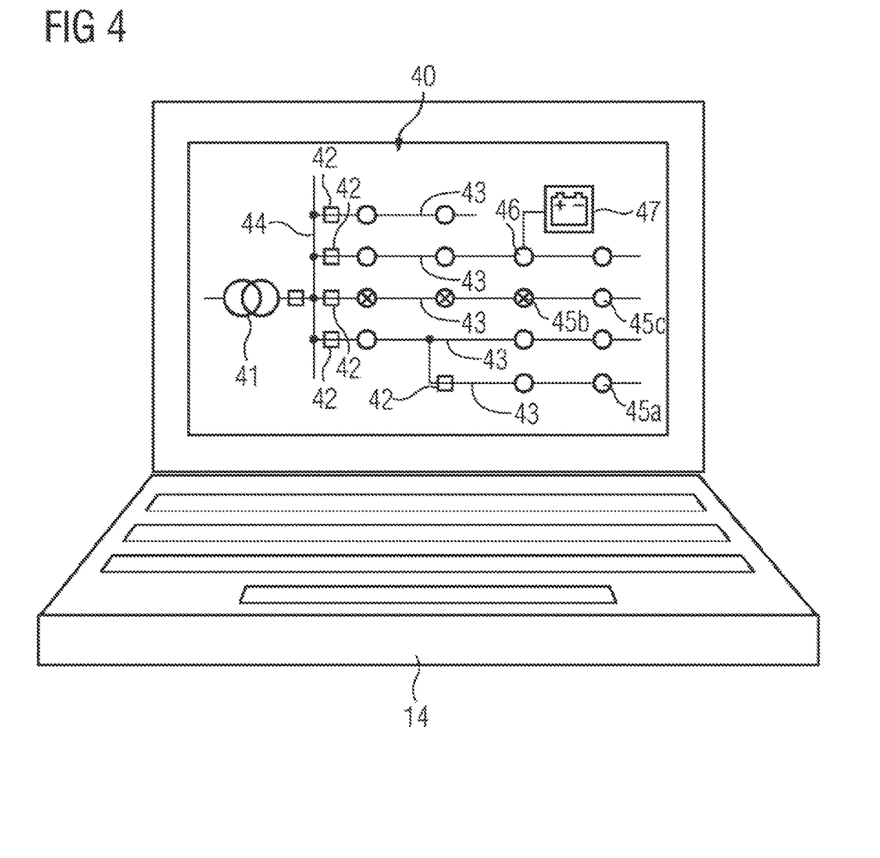
FIG. 4 is a schematic diagram of a monitoring device containing an example of a visualization of system status values and sensor status values.

Finally, FIG. 4 shows an example of a monitoring device 14 in the form of a laptop computer. The monitoring device 14 receives the system status values provided by the application server and, if applicable, the sensor status values, and converts said values into a corresponding visualization, which indicates to the operator of the energy delivery network the operating status of said network at the individual measurement locations.

In the example of FIG. 4, the system status values provided by the application server contain topology information in the form of a grid diagram indicating the topology of the energy delivery network. The system status values also comprise the information determined from the measured values or from the values derived therefrom about the operating status itself and information specifying the measurement location for that particular operating status. These system status values can be transmitted to the monitoring device 14, for example, as an HTML file or as an XML file, if applicable also containing dynamic components in the form of Java applets, ActiveX controls or Web services. This has the advantage that the monitoring device must have available merely a suitable browser for converting the system status values into a corresponding visualization. It is also possible, however, to transmit the system status values in any other formats, and other suitably designed visualization software can be provided on the monitoring device for displaying the system status values.

The monitoring device 14 displays on a display area, for example, the transmitted grid diagram 40, which shows the layout of the energy delivery network containing its essential components (e.g. transformers 41, switches 42, lines 43 and bus bars 44). In addition, the individual measurement locations of the sensors are entered in the grid diagram 40 as circles (e.g. circles 45a-c). Empty circles such as circles 45a and 45c constitute those measurement locations at which the operating status of the energy delivery network is lying in the admissible range. Circles marked with a cross, such as circle 45b, on the other hand constitute measurement locations at which an inadmissible operating status, e.g. a threshold value violation, has been detected. The operator can use the visualization to ascertain easily whether an inadmissible operating status exists at all. In addition, if an inadmissible operating status exists, the operator can narrow down its location in order to send a maintenance team to the likely fault location. In the case of FIG. 4, the fault must have occurred on line segments between the circles 45b and 45c.

In addition, the monitoring device 14 can display sensor status values provided by the application server. In the example of FIG. 4, the sensor at the measurement location 46 has transmitted to the application server a state value signaling a battery level. The application server generates from the state value, for example by comparing with a reference battery level, a sensor status value. For instance, this sensor status value can indicate a low battery level. In addition, the application server can assign a suitable battery symbol to the sensor status value. The monitoring device 14 generates from the received sensor status value for the measurement location 46, e.g. using the battery symbol received from the application server, a corresponding visualization 47, which indicates to the operator of the energy delivery network that a battery needs to be replaced for the sensor at the measurement location concerned.

The invention claimed is:

1. A method for monitoring an operating status of an energy delivery network, which comprises the steps of:
    acquiring measured values indicating the operating status of the energy delivery network from sensors disposed at measurement locations assigned to primary components of the energy delivery network;
    transmitting the measured values or values derived from the measured values first to an application server, disposed outside a sphere of influence of an operator of the energy delivery network;
    determining with the sensors state values indicating their own operating status and transmitting the state values to the application server;
    analyzing and/or processing the measured values or the values derived therefrom via the application server, thereby forming system status values indicating the operating status of the energy delivery network at a measurement location of a respective sensor;
    checking via the application server the measured values received with regard to their position in an admissible operating range of a respective primary component to which the respective sensor is assigned;
    forming system status values according to a result of the checking step via the application server and transmitting the system status values from the application server to a monitoring device of the operator of the energy delivery network; and
    generating, via the monitoring device of the operator of the energy delivery network, a visualization that indicates the operating status of the energy delivery network at the measurement location of the respective sensor, based on at least one of the measured values, the values derived therefrom or the system status values received from the application server;
    wherein the application server analyzes and/or processes the state values, thereby forming sensor status values which indicate an operating status of each of the sensors, the sensor status values are transmitted from the application server to the monitoring device of the operator of the energy delivery network; and
    wherein the monitoring device uses the sensor status values received from the application server to generate and display the visualization indicating the operating status of the respective sensor.

2. The method according to claim 1, which further comprises:
    providing each of the sensors with a long-range communication device; and
    transmitting the measured values or the values derived therefrom from the sensors to the application server using a long-range communication link established by the long-range communication device.

3. The method according to claim 1, which further comprises:
    providing each of the sensors with a short-range communication device;
    establishing a short-range communication link to a transmission component by means of the short-range communication device for transmitting the measured values the sensors have acquired or the values derived therefrom to the transmission component; and transmitting, via the transmission component, the measured values received or the values derived therefrom to the application server.

4. The method according to claim 1, wherein the sensors attach to the measured values to be transmitted to the application server or the values derived therefrom a unique sensor identifier and/or position information identifying a geographical position of the measurement location of the respective sensor concerned.

5. The method according to claim 1,
checking, via the sensors, the measured values themselves with regard to a position of the sensors in an admissible operating range of a particular primary component to which a sensor concerned is assigned;
forming via the sensors values derived from the measured values acquired according to a result of the checking;
transmitting derived values to the application server via the sensors; and
forming the system status values via the application server using the derived values received.

6. The method according to claim 1, which further comprises:
providing from the application server topology information describing a layout of the energy delivery network; and
forming via the application server the system status values, the application server using the measured values received or the values derived therefrom and the topology information to form the system status values by assigning a graphical representation of the operating status of the energy delivery network at the measurement location of the respective sensor to a position in the topology information, the position corresponding to the measurement location.

7. The method according to claim 1, wherein the application server stores in a database, histories of past measured values or values derived therefrom and/or histories of past system status values, and provides same for retrieval by the monitoring device of the operator of the energy delivery network.

8. The method according to claim 1, wherein:
when forming the system status values, the application server checks whether the system status values indicate an unwanted operating status of the energy delivery network; and
on the unwanted operating status being indicated, the application server sends a separate alarm message to a data processing device of the operator of the energy delivery network.

9. The method according to claim 1, wherein:
the application server interacts with a configuration device, which, when the operator of the energy delivery network procures a new sensor, transmits to the application server a unique sensor identifier together with an operator identifier specifying the operator of the energy delivery network; and
on being put into operation, the sensor uses the unique sensor identifier to register with the application server.

10. The method according to claim 1, wherein:
the application server contains a plurality of mutually separate data areas, which are protected from accessing one another;
the sensors belonging to different operators of energy delivery networks transmit the measured values or the values derived therefrom to the application server, wherein the application server assigns the measured values received or the values derived therefrom for each of the different operators solely to a data area associated with a particular operator of a given energy delivery network; and
the application server forms separately for each data area the system status values, and transmits the system status values solely to the monitoring device of the operator of the energy delivery network associated with a relevant data area.

11. A system for monitoring an operating status of an energy delivery network, the system comprising:
sensors disposed at measurement locations assigned to primary components of the energy delivery network and configured to acquire measured values indicating the operating status of the energy delivery network;
a monitoring device of an operator of the energy delivery network, said monitoring device being configured to generate on a basis of the measured values or values derived therefrom a visualization that indicates the operating status of the energy delivery network at a measurement location of a particular sensor of said sensors;
an application server disposed outside a sphere of influence of the operator of the energy delivery network;
said sensors being configured to determine state values indicating their own operating status and to transmit the state values or the values derived therefrom first to said application server;
said application server being configured to analyze and/or process the measured values or the values derived therefrom, thereby forming system status values which indicate the operating status of the energy delivery network at the measurement location of the particular sensor;
said application server further being configured to transmit the system status values to said monitoring device of the operator of the energy delivery network; and
said monitoring device being configured to use the system status values received from said application server to generate and display the visualization indicating the operating status of the energy delivery network at the measurement location of said particular sensor;
wherein said application server is configured to check the measured values received with regard to their position in an admissible operating range of a respective primary component to which the respective sensor is assigned, and to form the system status values according to a result of the checking step;
wherein said application server is configured to analyze and/or process the state values, thereby forming sensor status values which indicate an operating status of each of the sensors, and to transmit the sensor status values to the monitoring device of the operator of the energy delivery network; and
the monitoring device is configured to use the sensor status values received from the application server to generate and display the visualization indicating the operating status of the respective sensor.

12. The system according to claim 11, wherein at least some of said sensors are fault indicators, which are mounted on lines of the energy delivery network and are configured to acquire measured values that indicate a current flow through a line.

13. The system according to claim 11, wherein:
said application server contains a plurality of mutually separate data areas, which are protected from accessing one another;

said application server is configured to receive further measured values or further values derived therefrom from further sensors belonging to different operators of energy delivery networks, and to assign the further measured values or the further values derived therefrom for each operator solely to a data area associated with that particular operator of one of the different energy delivery networks; and said application server is configured to form separately for each of the mutually separate data areas the system status values, and to transmit the system status values solely to said monitoring device of the operator of the energy delivery network associated with a relevant data area.

14. A method for monitoring an operating status of an energy delivery network, the method comprising the steps of:

acquiring measured values indicating the operating status of the energy delivery network from sensors disposed at measurement locations assigned to primary components of the energy delivery network;

transmitting the measured values or values derived from the measured values first to an application server, disposed outside a sphere of influence of an operator of the energy delivery network;

analyzing and/or processing the measured values or the values derived therefrom via the application server, thereby forming system status values indicating the operating status of the energy delivery network at a measurement location of a respective sensor;

transmitting the system status values from the application server to a monitoring device of the operator of the energy delivery network; and generating, via the monitoring device of the operator of the energy delivery network, a visualization that indicates the operating status of the energy delivery network at the measurement location of the respective sensor, based on at least one of the measured values, the values derived therefrom or the system status values received from the application server;

wherein the application server interacts with a configuration device, which, when the operator of the energy delivery network procures a new sensor, transmits to the application server a unique sensor identifier together with an operator identifier specifying the operator of the energy delivery network; and on being put into operation, the sensor uses the unique sensor identifier to register with the application server.

15. The method according to claim 14, which further comprises:

transmitting, via the sensors, the measured values to the application server;

checking via the application server the measured values received with regard to their position in an admissible operating range of a respective primary component to which the respective sensor concerned is assigned; and forming the system status values according to a result of the checking step via the application server.

16. The method according to claim 14, wherein:

the sensors determine state values indicating their own operating status;

the state values are transmitted to the application server;

the application server analyses and/or processes the state values, thereby forming sensor status values which indicate an operating status of each of the sensors;

the sensor status values are transmitted from the application server to the monitoring device of the operator of the energy delivery network; and the monitoring device uses the sensor status values received from the application server to generate and display the visualization indicating the operating status of the respective sensor.

17. A system for monitoring an operating status of an energy delivery network, the system comprising:

sensors disposed at measurement locations assigned to primary components of the energy delivery network and configured to acquire measured values indicating the operating status of the energy delivery network;

a monitoring device of an operator of the energy delivery network, said monitoring device configured to generate on a basis of the measured values or values derived therefrom a visualization that indicates the operating status of the energy delivery network at a measurement location of a particular sensor of said sensors;

an application server disposed outside a sphere of influence of the operator of the energy delivery network;

said sensors configured to transmit the measured values or the values derived therefrom first to said application server;

said application server configured to analyze and/or process the measured values or the values derived therefrom, thereby forming system status values which indicate the operating status of the energy delivery network at the measurement location of the particular sensor;

said application server further configured to transmit the system status values to said monitoring device of the operator of the energy delivery network; and said monitoring device configured to use the system status values received from said application server to generate and display the visualization indicating the operating status of the energy delivery network at the measurement location of said particular sensor;

wherein said application server is configured to interact with a configuration device, which, when the operator of the energy delivery network procures a new sensor, transmits to the application server a unique sensor identifier together with an operator identifier specifying the operator of the energy delivery network, and wherein, on being put into operation, the sensor uses the unique sensor identifier to register with the application server.

* * * * *